United States Patent
Yoshida

(10) Patent No.: US 7,909,154 B2
(45) Date of Patent: Mar. 22, 2011

(54) PALLET EXCHANGER

(75) Inventor: Makoto Yoshida, Niwa-Gun (JP)

(73) Assignee: Okuma Corporation, Niwa-Gun (JP)

( * ) Notice: Subject to any disclaimer, the term of this patent is extended or adjusted under 35 U.S.C. 154(b) by 400 days.

(21) Appl. No.: 12/114,003

(22) Filed: May 2, 2008

(65) Prior Publication Data

US 2009/0000907 A1 Jan. 1, 2009

(30) Foreign Application Priority Data

May 29, 2007 (JP) ................................. 2007-142292

(51) Int. Cl.
*B65G 47/00* (2006.01)
(52) U.S. Cl. ............... 198/346.1; 198/346.2; 414/744.2; 414/222.07
(58) Field of Classification Search ............... 198/346.1, 198/346.2; 414/222.07, 744.2
See application file for complete search history.

(56) References Cited

U.S. PATENT DOCUMENTS

| | | | | |
|---|---|---|---|---|
| 4,781,512 A | * | 11/1988 | Ohta et al. | 414/226.03 |
| 4,797,052 A | * | 1/1989 | Ohta et al. | 414/744.3 |
| 4,832,170 A | * | 5/1989 | Takeuchi et al. | 198/346.1 |
| 4,934,031 A | * | 6/1990 | Maeda et al. | 29/33 P |
| 5,099,980 A | * | 3/1992 | Babel | 198/346.1 |
| 5,265,497 A | * | 11/1993 | Curless | 74/608 |
| 6,120,222 A | * | 9/2000 | Hiramoto et al. | 409/134 |
| 6,647,605 B2 | * | 11/2003 | Hiramoto et al. | 29/33 P |
| 7,627,937 B2 | * | 12/2009 | Jung | 29/33 P |
| 7,682,223 B2 | * | 3/2010 | Wirz et al. | 451/11 |
| 7,694,799 B2 | * | 4/2010 | Bae | 198/346.1 |

FOREIGN PATENT DOCUMENTS

JP 2006-305692 11/2006

* cited by examiner

*Primary Examiner* — Douglas A Hess
(74) *Attorney, Agent, or Firm* — Burr & Brown

(57) ABSTRACT

A pallet exchanger capable of providing a sufficient operation space on an operator's access side, for example, in front of a machining space, without increasing the size of the exchanger is provided. An arm is formed in a chevron shape in a plane view including two forks as pallet supporting parts, which are arranged radially from a turning spindle with less than 180° angle between them such as 120°. Further, by means of a table, the arm is slidable between a stand-by position in front of a machining space and a retreating position laterally separated by a predetermined distance from the stand-by position in a horizontal position. By moving the arm on the retreating position side, an operation space can be provided in front of the machining space.

2 Claims, 5 Drawing Sheets

PALLET EXCHANGER

BACKGROUND OF THE INVENTION

This application claims the entire benefit of Japanese Patent Application Number 2007-142292 filed on May 29, 2007, the entirety of which is incorporated by reference.

FIELD OF THE INVENTION

The present invention relates to a pallet exchanger, which is provided at a machine tool such as a vertical machining center or the like to exchange a pallet on which a machined work is placed for a pallet on which an un-machined work is placed.

DESCRIPTION OF THE BACKGROUND ART

A conventional machine tool, such as a vertical machining center or the like, includes a pallet exchanger to exchange a pallet on which a machined work is placed (it will be called as a-pallet with a machined work" below) for a pallet on which an un-machined work is placed (it will be called as a pallet with an un-machined work" below). For example, patent document 1 discloses one of the conventional pallet exchangers.

Patent document 1: Japanese Unexamined Patent Publication No. 2006-605692

A conventional pallet exchanger disclosed in patent document 1 will be described referring to FIG. 4.

The pallet exchanger 70 in FIG. 4 is provided in front of a machining space 71 of a machine tool. The pallet exchanger 70 includes an arm 72 which is turnable, liftable, and slidable in the front and back directions to the machine tool. Further, the arm 72 has a pair of forks 72a and 72a facing toward opposite directions. The pallet exchanger 70 exchanges a pallet with an un-machined work P1 for a pallet with a machined work P2 by sliding, lifting, and turning operations of the arm 72. In the pallet exchanger 70, when a new product is machined, an operator needs to access the machine tool main body in order to monitor machining, check a cutting tool attached to a main spindle device, or measure a product to be machined. To have an operation space S, the operator turns the arm 72 so as to make the forks 72a and 72a face in the right and left directions as illustrated in FIG. 4. Then the operation space S is provided in front of the machining space 71, that is, in front of the machine tool main body.

SUMMARY OF THE INVENTION

When a pallet exchanger is provided in front of a machining space, a certain space is required to operate the pallet exchanger. According to the conventional pallet exchanger 70, the operation space S is provided by turning of the arm 72. However, a sufficient operation space S cannot be provided by a turning operation of the arm 72, and thus it has been desired to have a larger operation space S. To have a larger operation space, the fork 72a has been projected longer and the arm 72 is turned. However, the length of the fork 72a is limited to keep certain strength thereof, and further, when the fork 72a is lengthened more, a larger space is needed to turn the arm 72, which increases a whole size of a pallet exchanger.

An object of the present invention is to provide a pallet exchanger capable of providing a sufficient operation space for an operator to access, for example, in front of a machining space, without increasing the size of the exchanger.

A first aspect of the present invention is a pallet exchanger including pallet exchange means which is adjacently provided to a machine tool and being advanced and retreated to a machining space through a work carry-in port, and turned to exchange a pallet on which a work is placed. The pallet exchange means further includes two pallet supporting parts radially arranged from a center of a turning spindle, and these pallet supporting parts are arranged in a chevron shape in a plane view having an angle between them to be less than 180°. Further, the pallet exchange means can be moved between a stand-by position on a front side of the work carry-in port and a retreat position separating by a predetermined distance from the stand-by position in a horizontal direction. When the pallet exchange means moves to the retreat position side, an operation space is provided in front of the work carry-in port.

A second aspect of the present invention is a pallet exchanger, in the first aspect, wherein the pallet exchange means can be moved to the additional device side as a retreated position side, when an additional device such as a tool magazine is adjacently provided to a machine tool.

According to the present invention, the pallet exchange means is movable between a stand-by position in front of the work carry-in port and a retreat position separating by a predetermined distance from the stand-by position in the horizontal direction and an operation space is provided in front of the work carry-in port by moving of the pallet exchange means to the retreat position side. Therefore, a larger and sufficient operation space for various maintenance and following up operations can be provided in front of a machining space by moving of the pallet exchange means to the retreat position when it is necessary.

Further, the pallet exchange means includes two pallet supporting parts radially arranged from the center of a turning spindle, and these pallet supporting parts are arranged in a chevron shape in a plane view having an angle between them to be less than 180°. Therefore, the length between an advancing position and a retreating position can be more shortened than the length of pallet exchange means having forks oppositely projected each other. As a result, the required moving distance for the pallet exchanger means to advance to a machining space can be shortened, and an exchange operation can be carried out quickly. In addition, a space for moving of the pallet exchange means, that is, an installation space of a pallet exchanger can be reduced, and thus the exchanger can be more compacted.

Further, as the pallet exchange means is in a chevron shape in a plane view, a turning angle at the time of exchanging a pallet is less than 180°. Therefore, the time for turning the pallet exchange means can be more shortened than that of pallet exchange means having forks oppositely projected, and thus the time for exchanging of the pallet can be reduced more.

In addition, according to the invention of the second aspect, when an additional device such as a tool magazine is adjacently provided to a machine tool, the pallet exchange means can be moved to the additional device side which is regarded as the retreat position side. Therefore, the present invention can utilize a space effectively and rationally.

DETAILED DESCRIPTION OF THE INVENTION

Figure 1:
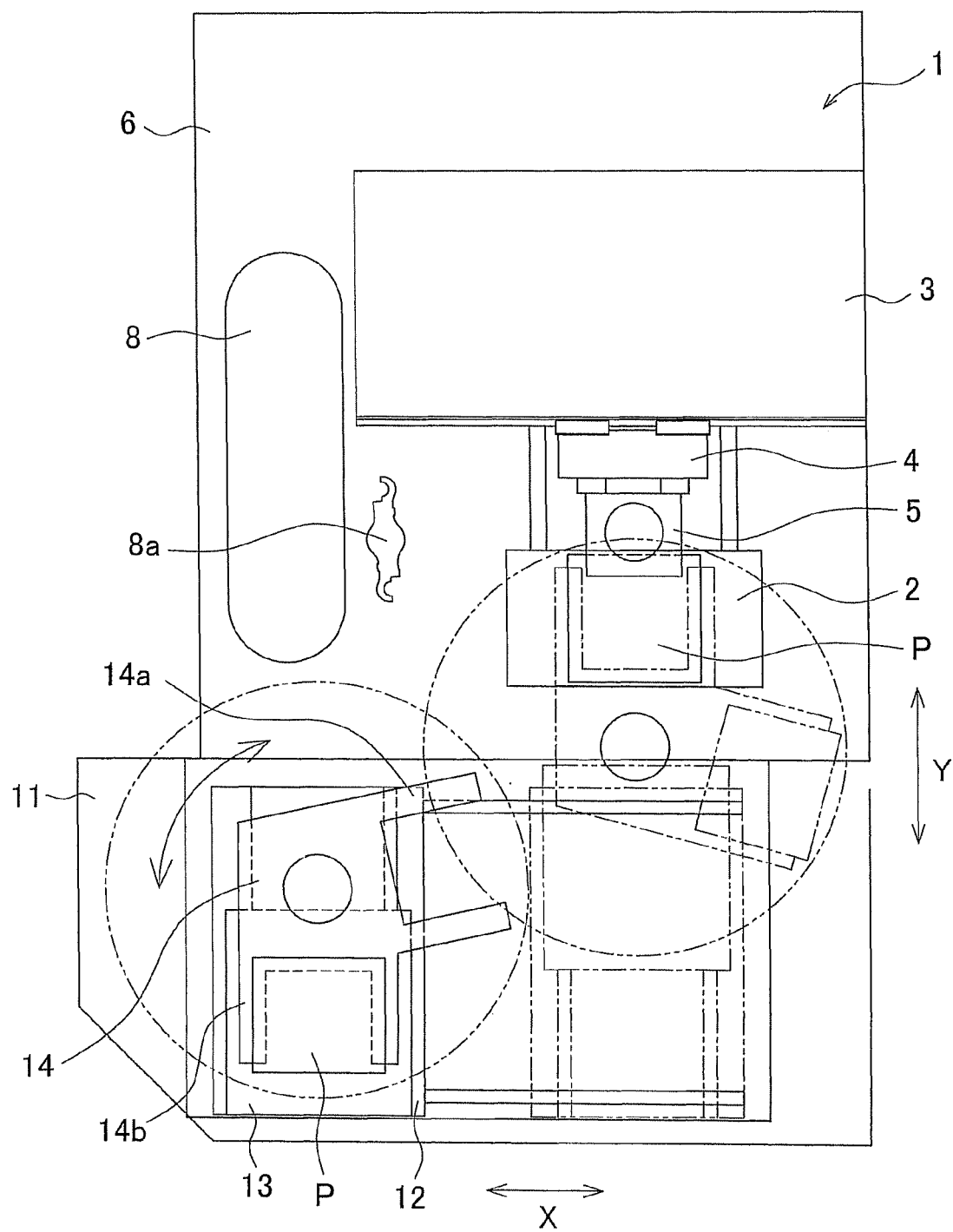
FIG. 1 is a drawing to illustrate a pallet exchanger and a machine tool from the upper direction.

A pallet exchanger according to one embodiment of the present invention will be described below referring to the drawings.

FIG. 1 is a drawing to illustrate a pallet exchanger and a machine tool 1 from an upper direction. In FIG. 1, it should be noted that, the X axial direction is a horizontal direction, the Y axial direction is front and back direction, and the direction in which the X axis and the Y axis are vertically crossed is the Z axial direction (the vertical direction). Further, a lower side in FIG. 1 is defined as a front side of a machine tool 1.

A machine tool 1 to which a pallet exchanger is attached is a vertical machining center including a table 2 slid in the Y axial direction, a cross rail 3 erected stepping over the table 2, a saddle 4 slid in the X axial direction on a front face of a cross rail 3, and a ram 5 slid in the Z axial direction on a front face of the saddle 4, and these are on a bed 6. The table 2 can have a pallet on which a work is placed thereon, and the ram 5 includes a main spindle head capable of mounting tools. Further, a cover (not illustrated) covers a space in which the table 2, the saddle 4, and the ram 5 are moved in front of the cross rail 3, and machining can be carried out inside of this cover (that is, in front of the cross rail).

Further, the machine tool 1 machines a work on a pallet provided on the table 2 from various directions in the machining space by moving the table 2 in the Y axial direction, moving the saddle 4 in the X axial direction, and moving the ram 5 in the Z axial direction. Further, with respect to the machine tool 1, an operator can access from the front of the machine tool 1 to monitor the machining (that is, in front of a machining space), and can check tools and measure a work after machining a new product (these operations are collectively called as a following up operation). In addition, a tool magazine 8 is provided on a side of the machine tool 1 as an additional device, and a turning arm 8a is provided for exchanging tools. Further, a control device (not illustrated, for example, an NC device) controls operations relating to machining of a work in the machine tool 1, for example, moving of the table 2, the saddle 4, and the ram 5.

A pallet exchanger is attached to the front side of the machine tool 1 and includes a base 11, a table 12 slid in the X axial direction on the base 11, a moving base 13 slid in the Y axial direction on the table 12, and an arm 14 as pallet exchange means. The arm 14 provided on the moving base 13 can be lifted in the Z axial direction by a driving device which is not illustrated, (for example, a hydraulic cylinder, a motor, or a speed reduction mechanism) and turned around the Z axis The arm 14 is in a chevron shape in a plane view, having two forks (pallet supporting parts) 14a and 14b, which are arranged radially from a turning spindle with less than 180° angles (the angle is 120° here). Further, each of the forks 14a and 14b has a pair of support pawls, which are provided in parallel at a predetermined interval (an approximately lateral width of the pallet), and the pallet is supported by insertion of the support pawls into lower sides of receive parts provided right and left sides of the pallet. Further, the table 12 is slidable in the X axial direction from the front position of the machining space to the front position of the tool magazine 8 provided on the side of the machine tool 1. In addition, the moving base 13 is slidable in the Y axial direction so as to move the arm 14 (that is, the forks 14a and 14b) between inside and outside of the machining space through a work carry-in port provided at the cover. Further, a door member capable of opening and closing is provided at the work carry-in port, and the machining space can be sealed during the machining by closing of the work carry-in port with the door member.

The control device (not illustrated) controls moving and turning of the table 12, the moving base 13, and the arm 14 of the pallet exchanger toward each direction.

Next, an exchange operation of the pallet with a machined work and the pallet with an un-machined work by means of the pallet exchanger will be explained referring to FIGS. 2A to 2H. Further, a retreating operation of the pallet exchanger at the time of a following up operation by an operator will be described referring to FIG. 3

It should be noted that the table 12 and the moving base 13 are not illustrated in FIGS. 2A to 2H.

First, exchange operations of a pallet with an un-machined work P1 and a pallet with a machined work P2 will be explained.

Figure 2A:
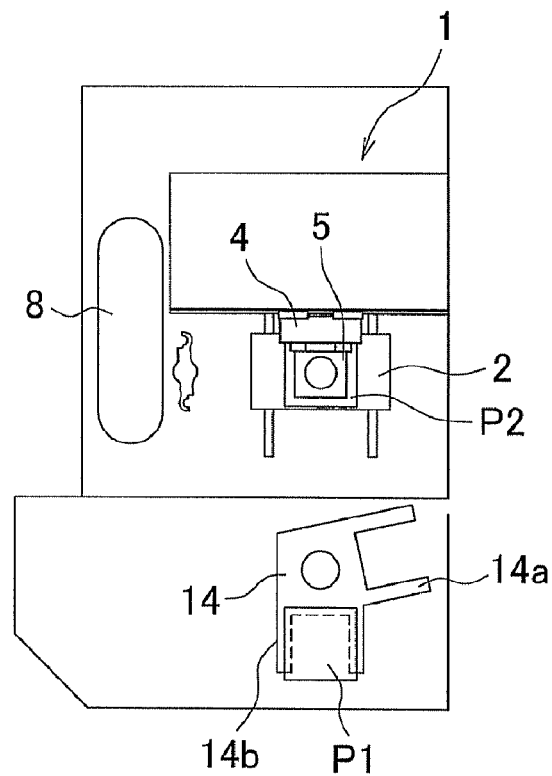
FIGS. 2A to 2H are drawings to illustrate an exchange operation of a pallet.

When a work on a pallet P2 put on the table 2 is machined where the pallet P2 is at the machining position, the arm 14 is at the stand-by position, which is in front of a machining space, with one of the forks 14b to be directed toward the front of the pallet exchanger. While the arm is at the stand-by position, an exchange preparation operation for attaching a following un-machined work to the pallet P1 which is supported by the fork 14b is carried out as shown in FIG. 2A.

Figure 2B:
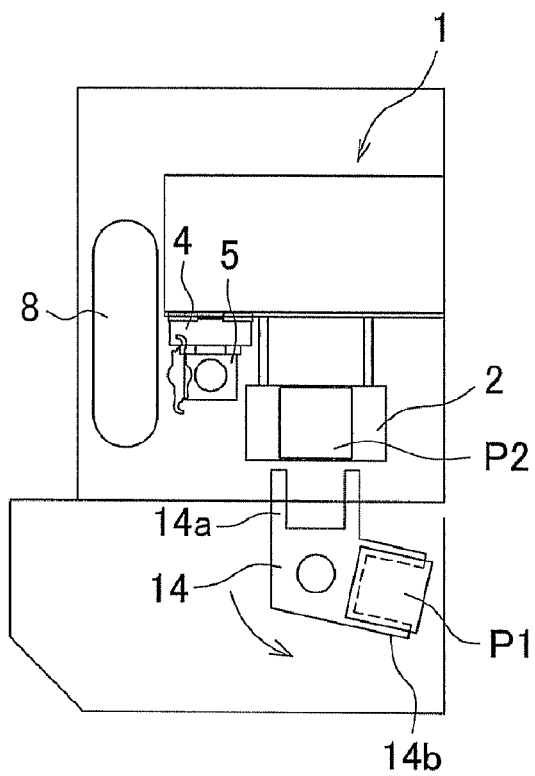

When machining of the work is finished, following a pallet exchange instructions, the saddle 4 and the ram 5 are retreated to the position where the pallet exchange operation is not disturbed and then the table 2 is advanced from a machining position to a predetermined exchange position in the machine tool 1. Further, the pallet exchanger turns the arm 14 at the stand-by position, and a fork 14a not supporting the pallet is directed toward a backside of the pallet exchanger that is the exchange position as shown in FIG. 2B.

Figure 2C:
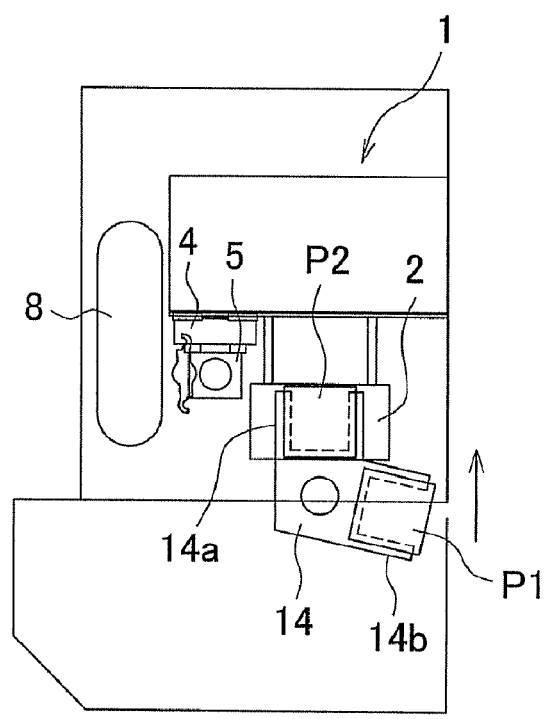
Figure 2D:
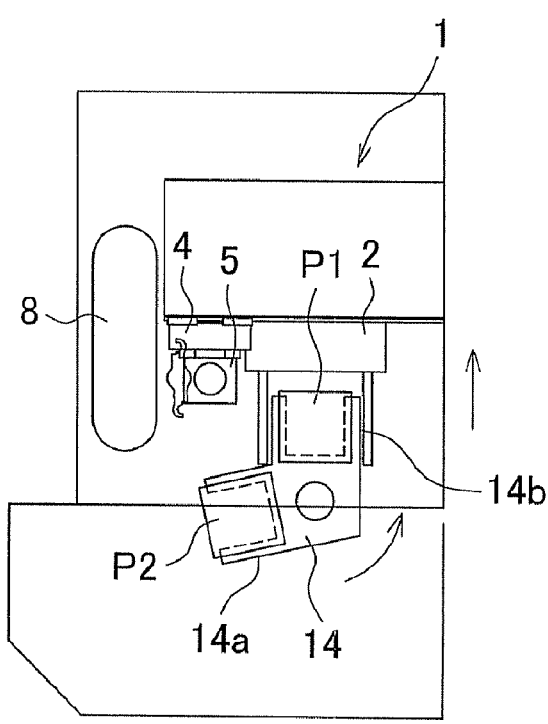

Next, the pallet exchanger moves the moving base 13 backwardly, and the fork 14a supports the pallet P2 with the machined work as illustrate in FIG. 2C. Then, the pallet exchanger lifts the arm 14 and unclamps the pallet with the machined work P2 from the table 2 and the machine tool 1 moves the table 2 backwardly to be retreated. On the other hand, the pallet exchanger turns the arm 14 after the table 2 is fully retreated, and the fork 14b supporting the pallet with an un-machined work P1 is directed backwardly (FIG. 2D).

Figure 2E:
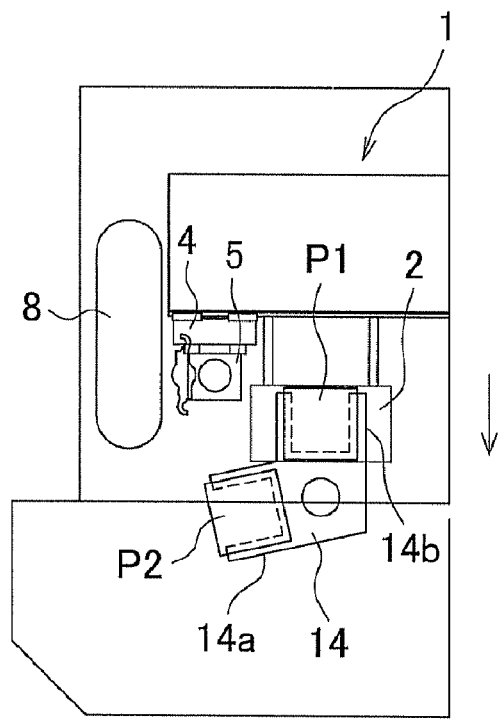

After a turning operation of the arm 14 is finished, the machine tool 1 moves the table 2 frontwardly again so as to position the table 2 at an exchange position. In the pallet exchanger, after a position of the table 2 is determined at the exchange position, the arm 14 is lowered and the pallet exchanger is clumped with the pallet with an un-machined work P1 on the table 2 as shown in FIG. 2E.

Figure 2F:
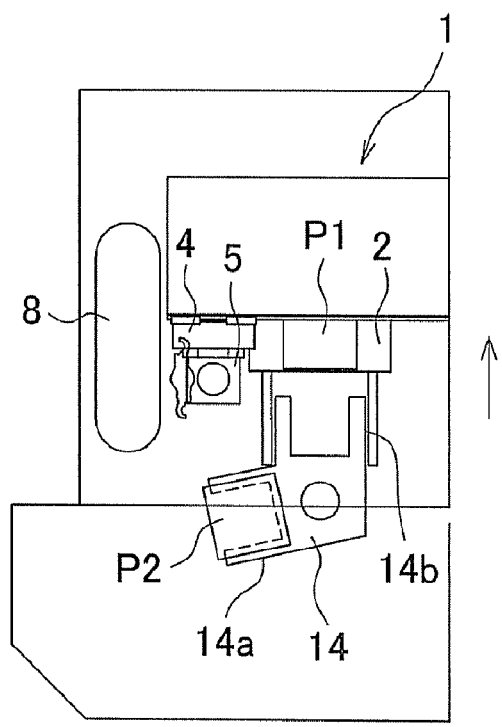
Figure 2G:
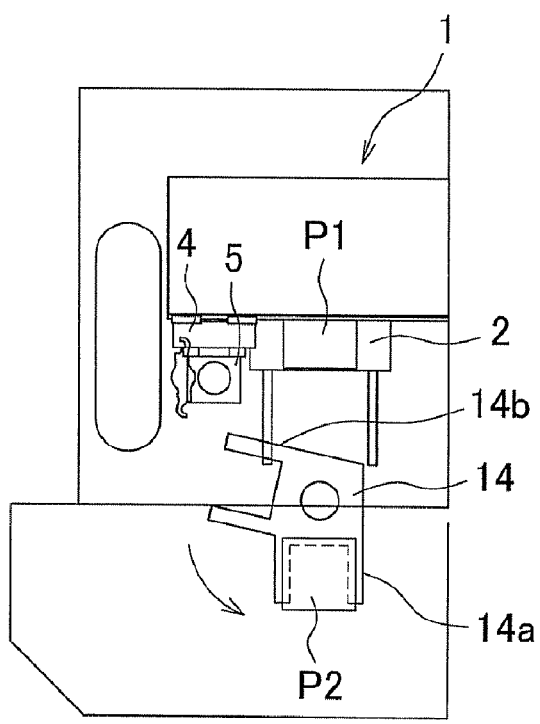
Figure 2H:
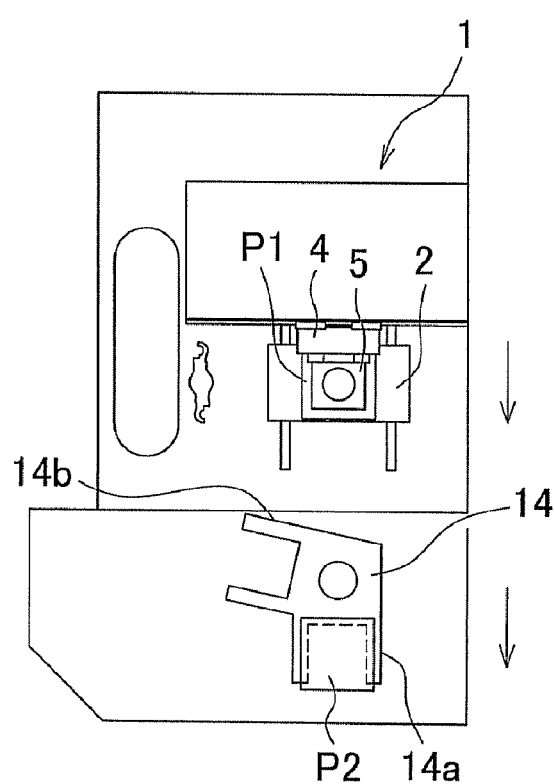

Then the machine tool 1 moves the table 2 backwardly to be retreated again (FIG. 2F). The pallet exchanger turns the arm 14, and the fork 14a supporting the pallet with the machined work P2 is directed toward the front (FIG. 2G). Then, the pallet exchanger moves the moving base 13 toward the front so as to position the arm 14 at the stand-by position, and the machine tool 1 positions the table 2 and the like at the machining position (FIG. 2H), which completes a pallet exchange operation.

Figure 3:
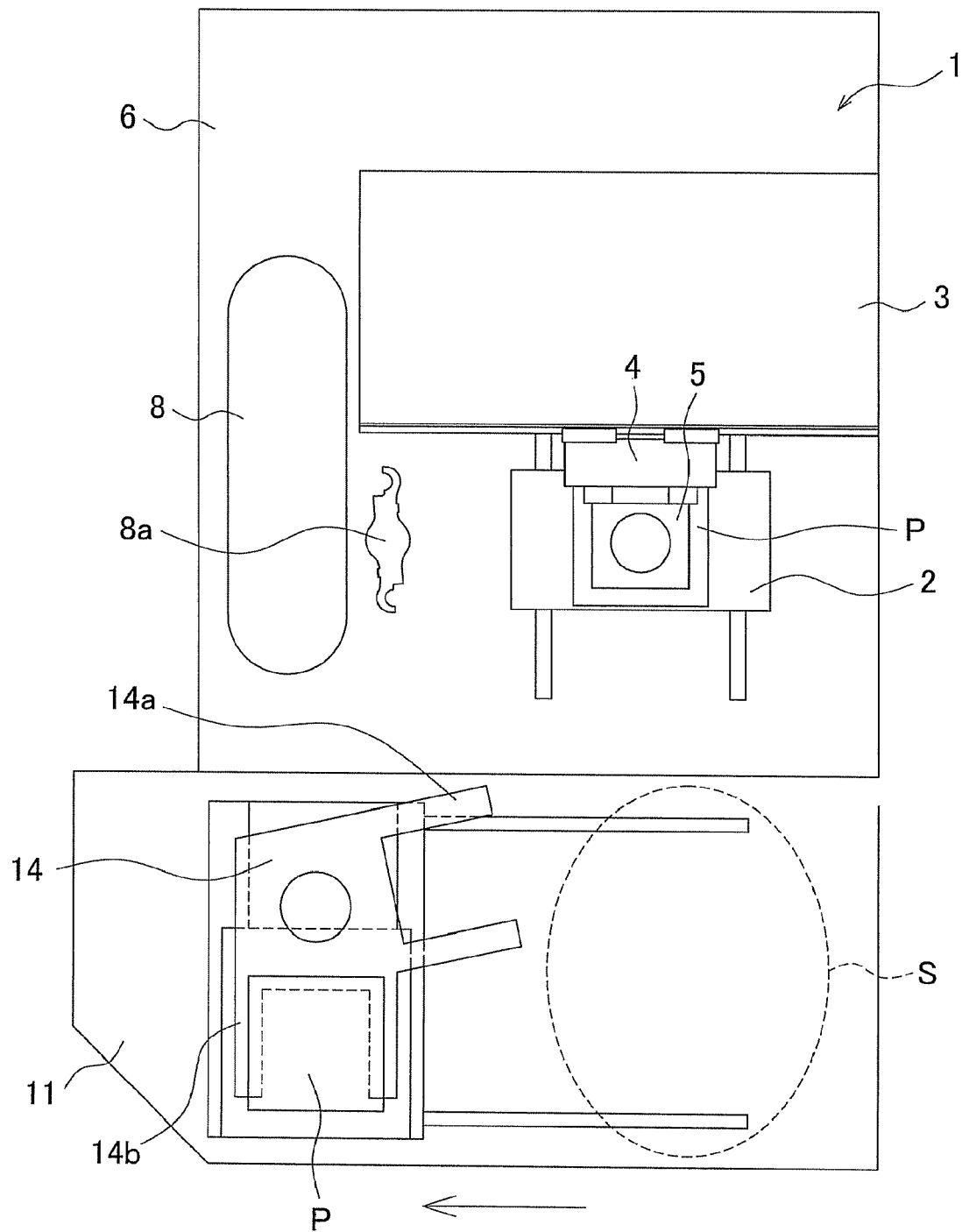
FIG. 3 is a drawing to illustrate a retreating operation of the pallet exchanger.
Figure 4:
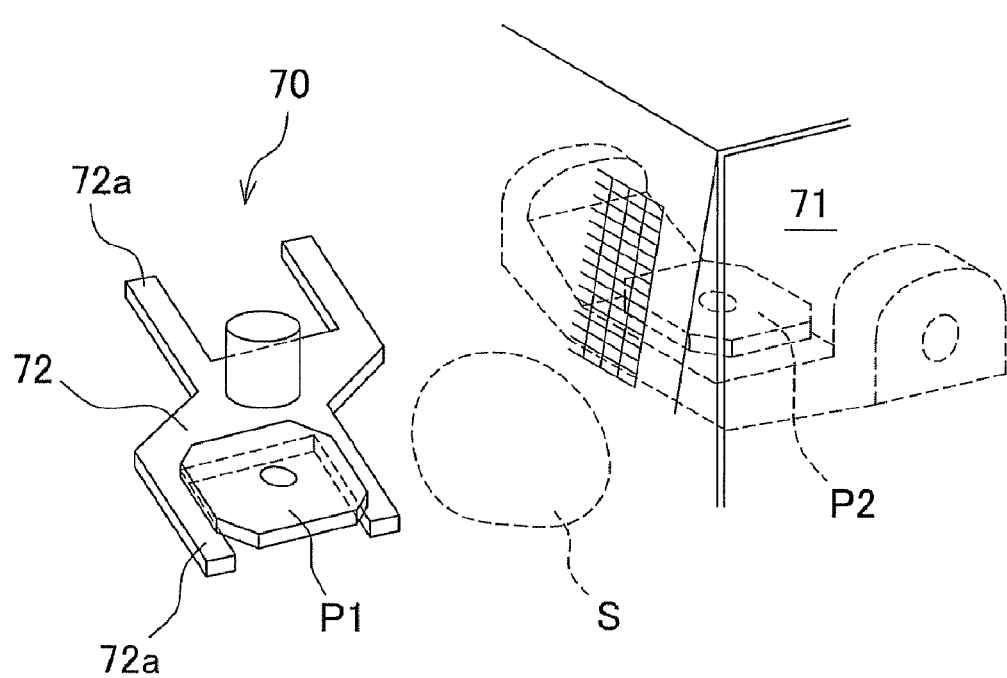
FIG. 4 is a drawing to illustrate a conventional pallet exchanger.

On the other hand, when a following up operation to check a machining state or the like is needed, the operator retreats the table 12 to the front side position of the tool magazine 8 (the retreating position) as illustrated in FIG. 3. Thereby, the operation space S can be provided in front of a machining space S, and the operator is able to carry out a following up operation there. In addition, of course, the operator is able to move the arm 14 to the retreating position while keeping a state illustrated in FIG. 2H so as to have the operation space S.

According to the pallet exchanger of the above-mentioned embodiment, the arm 14 is movable in the X axial direction and the operation space S can be provided in front of the machining space by retreating of the arm 14 when it is necessity. Therefore, a larger and sufficient operation space S for various maintenance operations can be provided. Further, the arm 14 is retreated to the front of the tool magazine 8 and thus, the pallet exchanger can utilize a space rationally and effectively.

Further, the arm 14 is arranged in a chevron shape in a plane view. Thus, the length of the arm 14 can be more shortened than an arm having forks oppositely projected (it will be called as an opposite direction type arm below). Therefore, the front and back moving distance of the arm 14 at the time of a pallet exchange operation can be shortened. In other words, the front and back moving distance needed for taking-out and taking-in the arm 14 to the machining space can be more shortened than that of the opposite direction type arm. Therefore, an exchange operation can be carried out within a short time. In addition, a required space for moving the arm 14, that is, an installation area of a pallet exchanger can be reduced, and thus the exchanger can be more compacted.

Further, when the arm 14 is in a chevron shape in a plane view, a turning angle of the arm at the time of exchanging a pallet with an un-machined work P1 for a pallet with a machined work P2 becomes to be less than 180°. Therefore, the time for an operation of turning the arm 14 can be more shorten than that of the opposite direction type arm. Thus, the entire time for exchanging of a pallet can be more shorten.

In addition, a pallet exchanger according to the present invention is not limited to the above-described embodiments. A table, a moving base, an arm, and a position relating to a machine tool can be properly changed within a range not deviating from the object of the present invention.

For example, although the arm in the above-described embodiment is in a chevron shape with an angle 120°, the angle can be changed as long as it is less than 180°, for example, 90°.

Further, a sliding direction of an arm can be also changed to have an operation space, in accordance of the shape of a machine tool, and a position or existence of an additional device such as a tool magazine.

In addition, the above-described embodiment is an example of a pallet exchanger attached to a vertical machining center or the like. However, the pallet exchanger can be attached to a horizontal machining center or a 5-axis machining center. Furthermore, a control device for a machine tool and a control device for a pallet exchanger can be separately provided.

What is claimed is:

1. A pallet exchanger comprising:

pallet exchange means provided adjacently to a machine tool, being advanced and retreated to a machining space through a work carry-in port, and being turned to exchange a pallet on which a work is placed, wherein the pallet exchange means includes two pallet supporting parts radially provided from a center of a turning spindle, the pallet supporting parts are arranged in a chevron shape in a plane view and comprise a pair of parallel support pawls, wherein an angle between the direction of each pair of parallel support pawls is less than 180°, the pallet exchange means can be moved between a stand-by position in front of the work carry-in port and a retreat position laterally separated by a predetermined distance from the stand-by position in a horizontal direction, and the pallet exchange means can provide an operation space in front of the work carry-in port by moving to the retreat position side.

2. The pallet exchanger according to claim 1, wherein when an additional device such as a tool magazine is adjacently provided to a machine tool, the pallet exchange means can be moved to the additional device side, regarding to the additional device as the retreat position side.

* * * * *